United States Patent [19]

Hostetler

[11] Patent Number: 4,594,041
[45] Date of Patent: Jun. 10, 1986

[54] TRUCK BED BALE LIFT

[75] Inventor: Dewey L. Hostetler, Harper, Kans.

[73] Assignee: DewEze Manufacturing, Inc., Harper, Kans.

[21] Appl. No.: 693,619

[22] Filed: Jan. 22, 1985

[51] Int. Cl.$^4$ ............................................. B65H 75/00
[52] U.S. Cl. ........................................ 414/24.5; 294/88;
 242/86.5 R; 242/78.8; 414/555; 414/684;
 414/729; 414/911
[58] Field of Search ....................... 414/245, 24.6, 914,
 414/910, 911, 908, 546, 547, 555, 684, 729, 741;
 294/88, 86 R; 242/78.6, 78.7, 78.8, 86.5 R

[56] References Cited

U.S. PATENT DOCUMENTS

| | | | |
|---|---|---|---|
| 3,266,641 | 8/1966 | Thumim | 414/19 |
| 3,625,445 | 12/1971 | Hall. | |
| 3,655,232 | 4/1972 | Martelee | 294/88 X |
| 3,817,567 | 6/1974 | Lull. | |
| 3,820,673 | 6/1974 | McVaugh | 414/911 X |
| 3,877,595 | 4/1975 | Edelman. | |
| 3,880,305 | 4/1975 | Van Polen. | |
| 3,902,612 | 9/1975 | Hall. | |
| 4,015,737 | 4/1977 | Wright et al. . | |
| 4,044,963 | 8/1977 | Hostetler. | |
| 4,090,624 | 5/1978 | Krein et al. . | |
| 4,091,946 | 5/1978 | Kraeft et al. | 414/555 X |
| 4,094,428 | 6/1978 | White et al. | 414/24.5 X |
| 4,288,191 | 9/1981 | Lynch. | |
| 4,325,666 | 4/1982 | Chain et al. . | |
| 4,364,701 | 12/1982 | Lynch et al. . | |
| 4,564,325 | 1/1986 | Ackerman | 414/245 |

Primary Examiner—Frank E. Werner
Attorney, Agent, or Firm—Litman, Day and McMahon

[57] ABSTRACT

A truck bed bale lift is provided for lifting large round bales of hay onto a flat bed truck. The bale lift assembly includes a pair of hugger arms which grip the hay bale to be manipulated and a mechanism for rotating the hugger arms through a loading/unloading arc. The lift mechanism comprises a rotatable crossbar on which the hugger arms are mounted. The crossbar is pivotally mounted to the rear of the truck and is rotated by a pneudraulic ram mounted underneath the flatbed to engage a series of links attached to the crossbar. The particular linkage system used provides adequate mechanical advantage for the lifting of the hay bale without needing an excessively large equipment structure. The particular structure described permits the flatbed portion of the truck to be kept relatively free of obstruction from portions of the bale lift assembly. More than one bale of hay may be lifted upon and transported by the truckbed; and, the flatbed may be utilized for purposes other than the transport of hay bales even when it has been modified by inclusion of the lift mechanism and hugger arms.

6 Claims, 10 Drawing Figures

TRUCK BED BALE LIFT

BACKGROUND OF THE INVENTION

This invention relates generally to farm equipment used in handling of bales of hay and the like, and more particularly to a vehicle mounted loader used in handling large round bales of hay.

Recently, the farming industry has been replacing production of the well-known small rectangular bale of hay with large cylindrical bales of hay using wire ties which are circumferential. The round bales are relatively large, in both diameter and length, and may have considerable weight. After making them, a baler normally leaves them laying on their cylindrical sides. These bales cannot be easily manipulated by hand or easily transported from the field. The present invention relates to means whereby such large cylindrical bales may be handled and transported.

Numerous devices have been developed for the handling of these large round bales of hay. Generally, such devices are of two basic types: the trailer type; and the truck-bed type.

The trailer type of bale lift and transporter is generally a trailer frame pulled behind a tractor or the like. The frame generally includes means for lifting the bale onto the trailer frame and holding it there. Several types of lift means have been developed including ones which spear the bale and ones which lift the bale upon a fork or similar structure. While such trailer devices have been relatively successful, they suffer from the inherent problem of requiring the farmer to have an extra piece of equipment, of considerable size, which can be both expensive and space consuming.

Numerous truck-bed bale lift devices have been developed to generally overcome these latter problems. Typically, such devices comprise racks which are mounted upon the bed of a truck. The devices generally include a hydraulic lift means, comprising either a spear which impales the bale or a fork lift type mechanism, which is lowered over the side or rear end of the truck to engage the bale and then lift it upon the truck bed. Such devices are generally characterized by the feature that the rack is mounted upon an upper face of the truck bed, and rests thereon. Thus, even when hay bales are not being transported, the rack structure generally covers the bed of the truck, preventing it from being used for other purposes. Further, in many such devices the truck bed is so occupied by the presence of the rack and lift assembly that there is only room for one bale on the truck at a time. Also, with such devices, the bale may come in contact with many of the moving parts of the rack and lift assembly. The problem with this is that if grease is used on moving parts of the assembly it may be transmitted to the hay and cause partial contamination thereof; also, the hay may interfere with smooth operation of the assembly.

The instant invention provides a novel round bale mover having mechanical structure advantages not disclosed in prior bale loading devices.

OBJECTS OF THE INVENTION

The objects of the present invention are: to provide a device for lifting and transporting objects such as large round bales of hay; to provide such a device which comprises a flatbed portion mounted upon a truck and a loader/unloader portion mounted upon the flatbed portion; to provide such a device in which an upper surface of the flatbed portion is relatively free of mechanical structures associated with the loader/unloader so that the flatbed portion may be used for purposes other than the transport of large round hay bales; to provide such a device in which the flatbed portion has a lower surface on which much of the mechanism which operates the loader/unloader assembly is mounted; to provide such a device in which the loader/unloader assembly comprises a pair of hugger arms which are lowered over an end of the flatbed portion to engage a hay bale and are then rotated over the flatbed portion to deposit the hay bale upon the flatbed portion upper surface; to provide such a device in which the distance between the hugger arms is adjustable so that bales of hay of varying length can be loaded and unloaded; to provide such a device for which contact between loaded and transported hay and portions of the device which may include grease is generally avoided; to provide such a device which generally allows the transport of more than one bale of hay at a time; to provide such a device which, when not in operation loading and transporting bales of hay, has a non-use position providing a generally attractive appearance and leaving the bed of the truck generally available for other uses; to provide such a device which when mounted upon a frame of a truck, does not encumber the ability of the user to mount a "fifth wheel" type hitch ball in the approximate center of the bed of the truck for attachment to a trailer or the like; and to provide such a device which is relatively easy to manufacture, simple to use, and which is particularly well adapted for the proposed usage thereof.

Other objects and advantages of this invention will become apparent from the following description taken in conjunction with the accompanying drawings wherein are set forth, by way of illustration and example, certain embodiments of this invention.

SUMMARY OF THE INVENTION

The instant invention provides a simple, yet ruggedly constructed, bale loader for mounting on various types and sizes of vehicles. The device comprises an assembly including a flatbed and a bale loader/unloader assembly. The flatbed has an upper surface and a lower surface and is mounted upon the truck frame by brackets located on the lower surface.

In the preferred embodiment, the flatbed portion is generally rectangular and has a front edge, side edges, and a rear edge, corresponding to the front, sides and rear of the truck. The loader/unloader assembly includes a pair of hugger arms which, when not in use, rest upon the flatbed upper surface substantially near the side edges. When loading of a bale as desired, the hugger arms are moved through an arc, over the rear edge of the flatbed, where they engage the bale to be loaded. Reversing of the arc movement lifts the bale onto the upper surface of the flatbed.

The mechanism which provides for the arc movement of the hugger arms is generally mounted on the lower surface of the flatbed and includes a portion mounted substantially adjacent the rear edge of the flatbed. A crossbar, upon which the hugger arms are mounted, is pivotally mounted to the flatbed along the rear edge thereof. Pneudraulic means mounted on the flatbed lower surface selectively actuates pivotal movement of the crossbar and thus arc movement of the hugger arms. The term "pneudraulic" as used herein refers to a piston and cylinder assembly of either the hydraulic or pneumatic type.

The lateral distance between the pair of hugger arms is generally adjustable, so that a given bale of hay may be grasped or released and so that bales of hay of various sizes can be readily accommodated. To provide for this adjustment, the hugger arms are slidably mounted within the crossbar. Double-acting expansion/contraction means comprising a pneudraulically actuated cylinder and piston arrangement, having two opposed pistons, is mounted within the crossbar and provides for selective actuation of lateral or telescoping movement of the hugger arms.

A particular structural advantage to the instant invention is a system of links, detailed below, which control rotation of the crossbar, and arc movement of the hugger arms. The system of links allows for the entire loading/unloading movement of the hugger arms to be controlled with relatively little movement of the pneudraulic means, so that the pneudraulic means can be mounted underneath the flatbed, and out of the way. The link system is, itself, relatively small, so that it takes relatively little space yet provides considerable mechanical advantage, enabling relatively heavy loads to be handled. This adds to the ability to store much of the loader/unloader assembly under the flatbed and out of the way, or on the rear edge of the flatbed, where it does not interfere with the use of the flatbed for other purposes.

When the device is not in use loading, transporting or unloading bales of hay, it is mounted upon the truck with the hugger arms resting upon the flatbed portion, substantially near the opposite side edges. This leaves an attractive appearance and also leaves substantial portion of the upper surface of the flatbed free and unobstructed so that the flatbed may be utilized for purposes other than the transport of bales of hay. Thus, the assembly need not be separated from the truck when it is desired that the truck be used for other purposes such as the transport of materials other than hay bales. Also, a hitch ball for a trailer may be mounted in the approximate center of the flatbed, so that the truck may be used to pull a trailer, such as a fifth wheel type trailer, with a hitch which engages a ball mounted approximately over the axle of the towing vehicle, even when the loader/unloader assembly is mounted on the truck.

It will be understood that numerous additional features may be provided in cooperation with the present invention. For example, an upright stop may be mounted upon the front edge of the flatbed to protect the cab and driver from materials loaded on the bed of the truck. Further, an equipment storage bin, or a cabinet for a pump and control switches for the loader/unloader assembly, may be mounted underneath the flatbed. Rails may be mounted near the side edges of the flatbed to aid in holding any loaded materials on the flatbed during movement of the truck. It is also foreseen that spinners may be mounted on the hugger arms to engage a hay bale and allow it to be unrolled during unloading.

It will be easily understood that a device or assembly according to the present invention is readily adaptable to mounting upon numerous vehicles including a variety of trucks. Generally, this merely requires a modification in the arrangement of brackets, mounted on the lower surface of the flatbed portion, which engage the truck frame and attach the flatbed thereto. The assembly which permits loading and unloading of the hay bales is generally mounted upon the flatbed portion itself, so that the entire device may be relatively easily mounted upon a truck and removed therefrom.

The drawings constitute a part of this specification and include exemplary embodiments of the present invention and illustrate various objects and features thereof.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a truckbed bale lift assembly according to the present invention.

Figure 1:
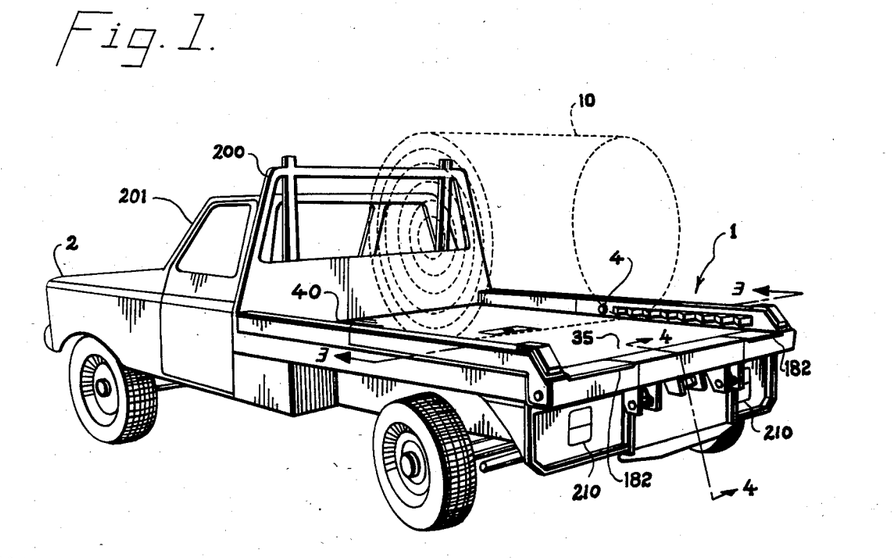
FIG. 1 is a perspective view of a truck-bed bale lift assembly, according to the present invention, mounted upon a truck; a hay bale is shown in phantom lines.

In FIG. 1, the truck-bed bale lift assembly 1 is shown mounted upon the frame of a truck 2 for operational use. The assembly 1 is utilized to handle large cylidrical bales of hay, and in FIG. 1 such a bale of hay is shown in phantom lines and is designated by reference numeral 10.

For ease of description and representation the truck frame 2 is generally not shown in many of the drawings, however it will be understood that the assembly 1 is normally utilized in cooperation with a truck 2, FIG. 1.

Figures 2, 3:
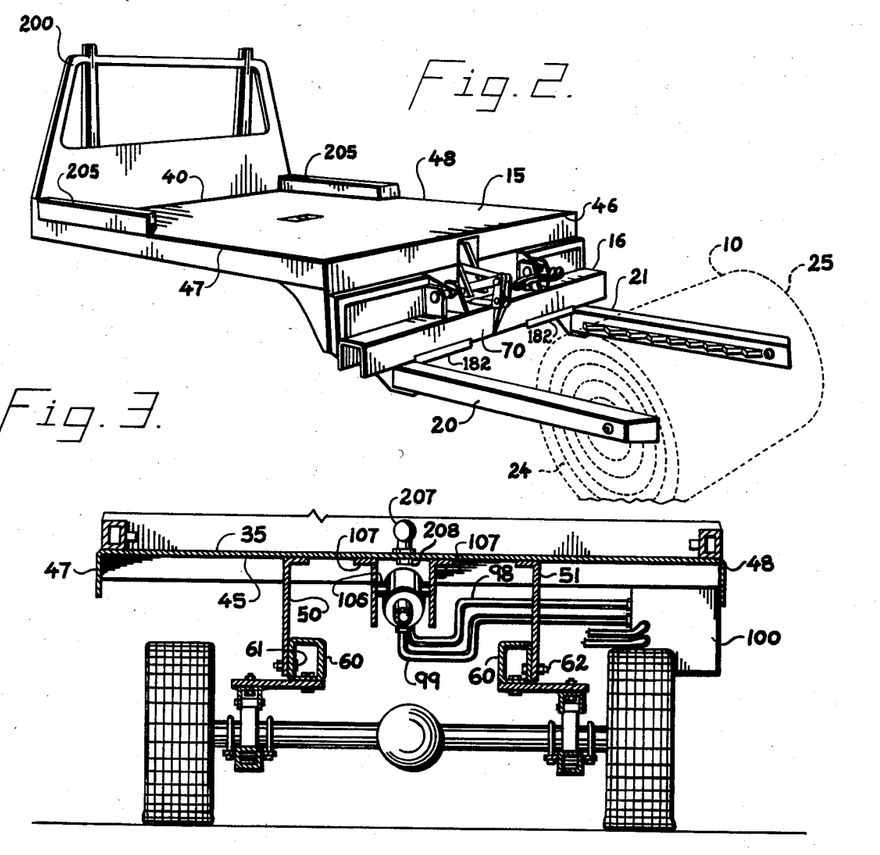
FIG. 2 is a perspective view of a truck-bed bale lift assembly, according to the present invention, in an engagement orientation, wherein a bale, shown in phantom lines, resting upon a field is engaged by the assembly.
FIG. 3 is an enlarged, cross-sectional view of a truck, having the truck bed bale lift assembly mounted thereon, taken generally along line 3—3 of FIG. 1.

The assembly 1 generally comprises a flatbed portion 15 and a bale loader assembly 16, FIG. 2. The general operation of these two components of the assembly 1 is understood by reference to FIGS. 2 and 1. In FIG. 2, the assembly 1 is shown engaging a bale of hay 10. The hay bale 10 will be understood to be resting upon the surface of a field (not shown), in which it was constructed by a mower and baler, or possibly in a storage location. The bale loader assembly 16 includes opposite and parallel hugger arms 20 and 21 which engage the hay bale 10 on opposite ends 24 and 25 thereof. The bale loader assembly 16 includes expansion means comprising an expansion/contraction mechanism 30, FIG. 8, permitting a longitudinal distance between the hugger arms 20 and 21 to be selectively adjusted. Through operation of the expansion/contraction mechanism 30, the bale loader assembly 16 engages the hay bale 10, FIG. 2.

Figure 4:
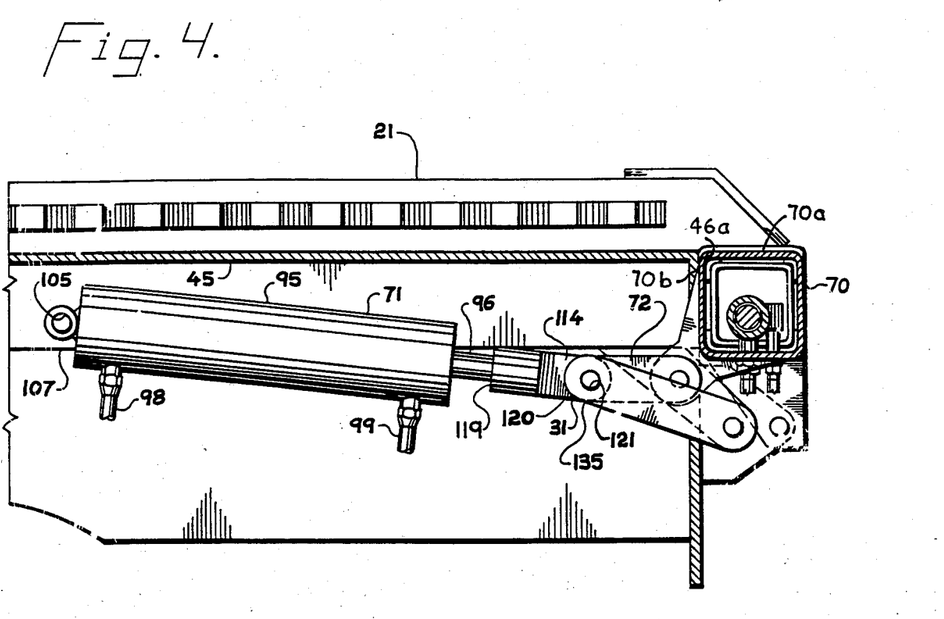
FIG. 4 is an enlarged, fragmentary, side cross-sectional view taken generally along line 4—4 of FIG. 1.
Figures 5, 6:
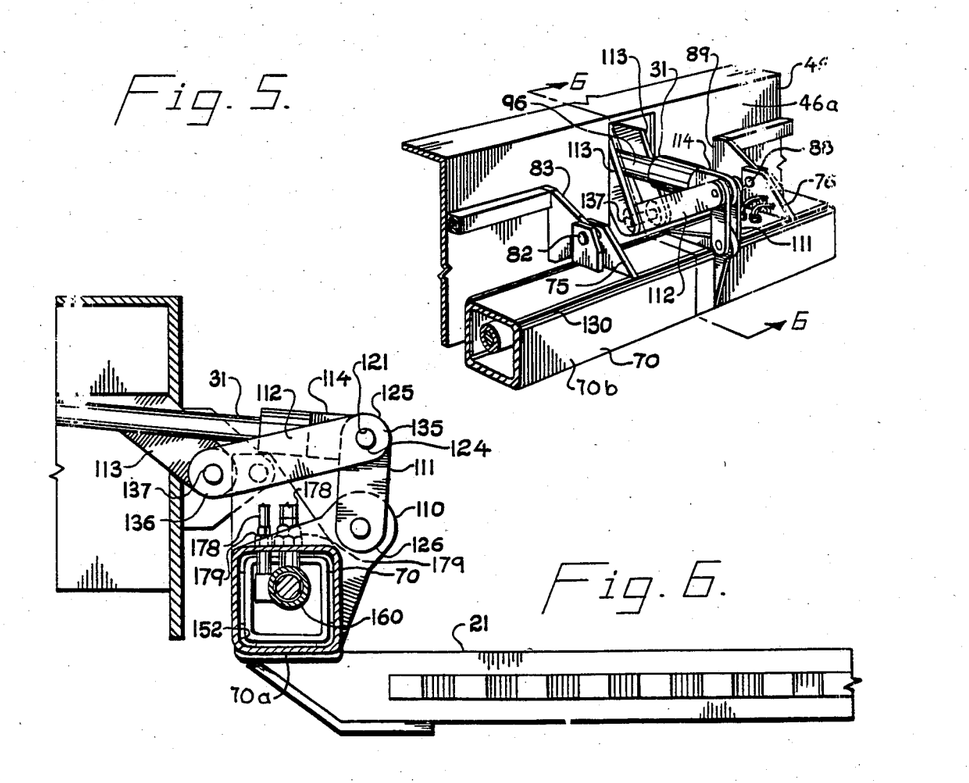
FIG. 5 is an enlarged, fragmentary, perspective view of a portion of the assembly shown in FIG. 2 and with certain internal details shown.
FIG. 6 is an enlarged, fragmentary, side cross-sectional view of the assembly according to the invention in the mode of operation of FIG. 2 and taken generally along line 6—6 of FIG. 5.

Once the assembly 1 is utilized to engage a bale 10 in the field, FIG. 2, the bale 10 is loaded upon the flatbed portion 15 by operation of a loader/unloader mechanism 31, FIGS. 4 and 6, which comprises a portion of the bale loader assembly 16. Through operation of the loader/unloader mechanism 31, the hugger arms 20 and 21 are moved through a loading arc to position the bale 10 over an upper surface 35 of the flatbed portion 15, after which the hugger arms 20 and 21 are selectively activated to release the bale 10. It is readily seen that this movement will deposit the hay bale 10 upon the flatbed portion 15.

After the hay bale 10 is placed upon the flatbed portion 15, it may be released by the hugger arms 20 and 21 through actuation of the expansion/contraction mechanism 30. Complete arc movement of the hugger arms 20 and 21 will leave the arms resting upon the upper surface 35 of the flatbed portion 15 as shown in FIG. 1. In some instances, a second bale may be loaded, with the action of the hugger arms and second bale generally pushing the first bale forward on the truck bed.

Detailed descriptions of the assembly 1 and its various components, referred to above, which permit the operation previously described are as follows:

Referring to FIGS. 2 and 3, the flatbed portion 15 generally includes the upper surface 35, a lower surface 45, the front edge 40, a rear edge 46 with a rear edge flange 46a, FIG. 4, and side edges 47 and 48 respectively. The flatbed portion 15 is mounted upon the truck 2 by means of brackets 50 and 51. It will be understood that a variety of bracket assemblies may be utilized, depending in part on the type of truck used. In the embodiment described, FIG. 3, the brackets 50 and 51 are attached to the lower surface 45 of the flatbed portion 15, as by welding. The brackets 50 and 51 extend between the flatbed portion 15 and a portion of the frame 60 of the truck 2. Bracket 50 is shown attached to the frame 60 by bolt 61, and bracket 51 is analagously shown mounted by bolt 62. It will be readily understood that numerous bolts, not shown, may be used to ensure a secure mounting. Via the above assembly, the flatbed portion 15 replaces the normal bed of the truck 2, placing the entire assembly 1 in position for operation.

The loader/unloader mechanism 31, FIGS. 4, 5 and 6, is utilized to actuate arc movement of the hugger arms 20 and 21 between the positions shown in FIG. 2 and FIG. 1, thus loading or unloading a bale 10 onto or from the upper surface 35 of the flatbed portion 15. The loader/unloader mechanism 31 includes a crossbar 70, FIG. 2, mounted substantially near the rear edge 46 of the flatbed portion 15. Pivoting means including a pivoting actuator 71 and a bar linkage 72, FIG. 4, are utilized to rotate the crossbar 70, causing arc movement of the hugger arms 20 and 21.

Referring to FIG. 5, the crossbar 70 is pivotally mounted upon the truck 2 as follows:

Two pair of yoke extensions, 75 and 76 respectively, are mounted upon the crossbar 70 as by welding, FIG. 5. Yoke extension pair 75 comprises two upright members having an axle 82 extending therebetween. A projection 83 mounted upon the truck 2, as by welding, engages the axle 82 in a pivotal manner. Similarly, yoke extension pair 76 comprises two upright members having an axle 88 extending therebetween. Extension 89, which is mounted on the truck 2, engages the axle 88 in a pivotal manner. By means of the yoke extension pairs 75 and 76 engaging the extensions 83 and 89 respectively, the crossbar 70 is suspended from the truck 2 substantially near the rear edge 46 of the flatbed portion 15. Further, the crossbar 70 is rotatably mounted upon the extensions 83 and 89 by means of engagement between the extensions 83 and 89 and the respective axles 82 and 88.

Rotation of the crossbar 70 actuates arc movement of the hugger arms 20 and 21 and thus operation of the assembly 1. Referring to FIG. 4, when the bar 70 is pivoted to the extreme position shown, its upper surface 70a forms a substantially coplanar extension with the flatbed upper surface 35, and an abutting surface 70b on the crossbar 70 substantially abuts the rear edge flange 46a. The arc movement is controlled by the pivoting actuator 71 and bar linkage 72. The pivoting actuator 71 comprises a pneudraulic cylinder 95 and ram 96 assembly, FIG. 4. The pneudraulic cylinder 95 is a double acting cylinder, that is, the ram 96 is powered by fluid pressure both as it extends from the cylinder 95 and as it is retracted therein. Fluid lines 98 and 99 deliver fluid necessary for control of the pneudraulic cylinder 95 and ram 96 from a control pump, (not shown), encased in a box 100 mounted underneath the flatbed portion 15.

The pneudraulic cylinder 95 is mounted on the lower surface 45 of the assembly 1, FIG. 3, by means of an eye 105, FIG. 4, mounted on the cylinder 95 which engages an axle 106, FIG. 3, extending between two brackets 107 mounted, as by welding, to the flatbed portion lower surface 45. Engagement between the eye 105, and the axle 106 is lose enough to accommodate pivotal mounting of the cylinder 95 in the assembly 1. This pivotal mounting of the cylinder 95 is to accommodate actuation of pivotal moving of the crossbar 70, described below.

The pneudraulic cylinder 95 and ram 96 comprise a portion of the pivoting actuator 71 which engages bar linkage 72 to actuate selected pivotal movement of the cross bar 70. The bar linkage 72 comprises an extension eye 110 mounted upon the crossbar 70, a pair of connector links 111, a pair of idler links 112, idler link extensions 113 and a ram engaging link 114. The interaction of these links is understood by reference FIGS. 4, 5, and 6.

Referring to FIG. 5, the ram 96 has an end 119 on which ram engaging link 114 is mounted. The ram engaging link 114 includes an end 120 having an aperture 121 therein. A pair of connector links 111 engage the ram engaging link 114, pivotally, by means of axle 124. Each connector link 111 has a first end 125 and a second end 126. The first end 125 engages the ram engaging link 114 and the second end 126 engages the extension eye 110. The extension eye 110 comprises an eye mounted, as by welding, to extend from an outer edge 130 of the crossbar 70. It will be understood that as the ram 96 extends from the cylinder 95 the connector links 111 will generally be pushed outwardly from the truck 2, applying pressure to the extension eye 110, and thus the crossbar 70. If the pressure is appropriately directed, this causes rotational movement of the crossbar 70 upon the axles 82 and 88 to rotate the crossbar 70 and thus generate arc movement of the hugger arms 20 and 21. Mechanical advantage is provided by the location of the eye 110 on edge 130 of the crossbar 70.

The direction of pressure generated by the pneudraulic cylinder 95 and ram 96 on the connector links 111 is controlled by the idler links 112, FIG. 5. The idler links 112 comprise a pair of links each having a first end 135 and a second end 136. The first end 135 of each idler link 112 is pivotally connected to the axle 124 on which the connector links 111 and the ram engaging link 114 are pivotally mounted. The second end 136 of each idler link 112 is pivotally connected to extensions 113 which are mounted on the flatbed portion 15. Axle 137 provides the pivotal connection between the idler links 112 and the extensions 113. It is readily seen that as the ram 96 extends or contracts, the idler links 112 will cause arc movement of the connector links 111 between two extremes, represented by FIGS. 4 and 5. In the first extreme, FIG. 4, the ram 96 is completely retracted, the connector links 111 are pulled to a position underneath the flatbed portion 15 and the idler links 112 are rotated so that the first ends 135 thereof project underneath the flatbed portion 15. In the second extreme, FIG. 6, the ram 96 is completely extended, the connector links 111 are positioned outwardly from the rear edge 46 of the flatbed portion 15 and the idler links 112 project with the first ends 135 thereof extending outwardly from the rear edge 46 of the truck 2. It will be understood that as the ram 96 moves between these two extreme positions the arc movement of the idler links 112 in cooperation with pivotal movement of the connector links 111 will cause the extension eye 110 to move the crossbar 70 through an arc defined by rotation upon the axles 82 and 88. As is understood by reference to FIGS. 1 and 2, this rotational movement is controlled by the pivoting actuator 71 mounted underneath the flatbed portion 15 and by the bar linkage 72, both of which are relatively space conserving and do not include any major portions which extend above or over the upper surface 35 of the flatbed portion 15.

Referring again to FIG. 2, each hugger arm, 20 and 21 respectively, extends outwardly from the crossbar 70. As the crossbar 70 is rotated, as above described, both hugger arms 20 and 21 will move through an arc between the extreme positions represented by FIG. 2 and FIG. 1, or, analagously, FIG. 6 and FIG. 4. As referred to above, the lateral distance between the hugger arms 20 and 21 is controlled by the expansion/contraction mechanism 30. It will be understood that if a hay bale 10, FIG. 2, is positioned between the hugger arms 20 and 21, when the expansion/contraction mechanism 30 is selectively operated to contract the distance between the hugger arms 20 and 21, the hay bale 10 will become firmly gripped and held between the hugger arms 20 and 21. In this manner, the hay bale 10 will be supported by the assembly 1 during rotation of the crossbar 70, to lift the hay bale 10 onto the flatbed portion 15 or remove it therefrom. The expansion/contraction mechanism 30 is best understood by reference to FIG. 7 and FIG. 8.

Figure 7:
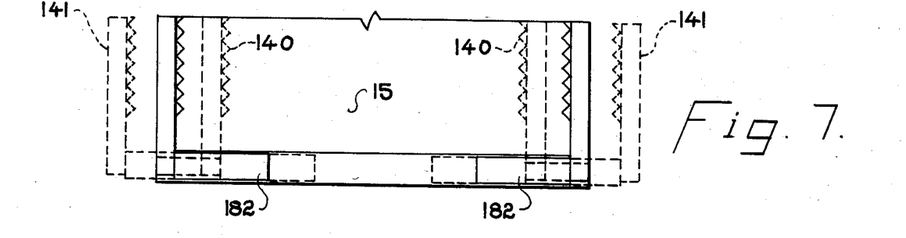
FIG. 7 is a fragmentary, top plan view of a portion of the assembly shown in FIG. 1, with phantom lines illustrating certain movable parts in various orientations.

Referring to FIG. 7, it will be generally understood that the expansion/contraction mechanism 30 may be utilized to adjust the lateral distance between the hugger arms 20 and 21 such that the distance is substantially less than the width of the flatbed portion 15. Also, the expansion/contraction mechanism 30 may be utilized to selectively adjust the distance between the hugger arms 20 and 21 so that it is substantially greater than the width of the flatbed portion 15. These two extreme possibilities are represented by the phantom lines in FIG. 7, phantom lines 140 representing the former or narrower orientation, and phantom lines 141 the latter or wider extreme.

Figures 8, 9:
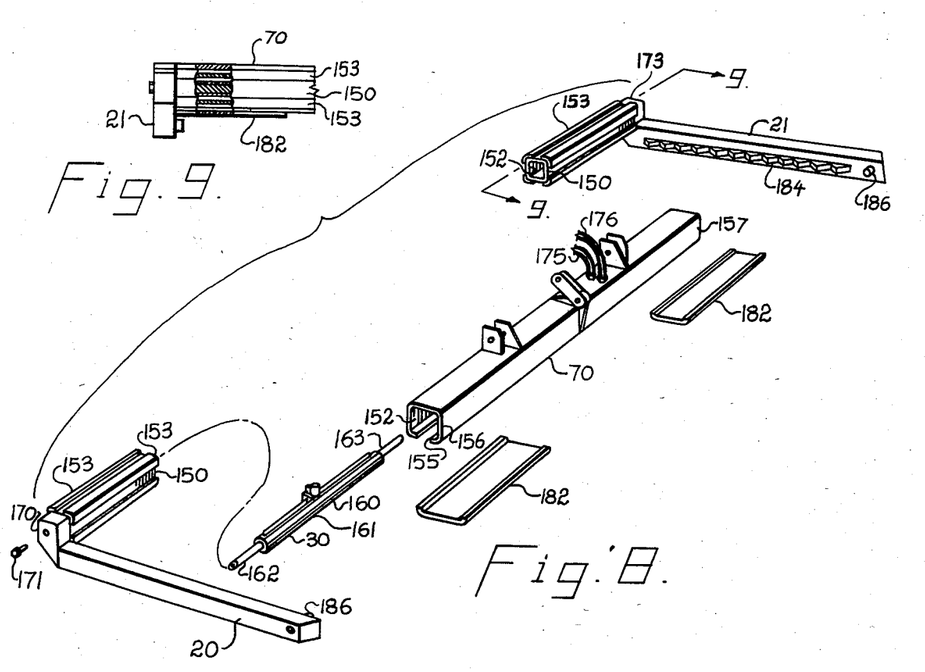
FIG. 8 is an enlarged, fragmentary, exploded view of a portion of the assembly shown in FIG. 2.
FIG. 9 is a fragmentary, cross-sectional view of a portion of the assembly taken generally along line 9—9 of FIG. 8.

Referring to FIG. 8, each hugger arm, 20 and 21, is mounted upon a crossbar extension or slide 150. The cross bar slides 150 are suitably sized to be telescopically received within a longitudinal channel 152 extending completely through the crossbar 70. In the particular embodiment described, both the crossbar 70 and the extensions 150 have a generally square cross-section. A snug, but slidable, interface between the crossbar extensions 150 and the internal portion of the crossbar 70 is ensured by spacers 153 mounted, as by welding, along each edge of each of the slides 150. By means of the slides 150, the hugger arms 20 and 21 are slidably mounted upon the crossbar 70.

A contraction cut or groove 155 in each end of the crossbar 70 permits movement of the slides 150 to position the hugger arms 20 and 21 a longitudinal distance from one another which is less than the length of the crossbar 70. In FIG. 8, one of the contraction cuts 155 can be viewed in a first end 156 of the bar 70. It will be understood that an analogous cut, not shown, is positioned substantially near the second end 157 of the bar 70. In the embodiment shown, the contraction cut 155 does not continue throughout the entire length of the bar 70, but rather each cut 155 is approximately one-eighth of the length of the crossbar 70, while the slides 150 are about twice as long as each cut 155. Under these circumstances, the hugger arms 20 and 21 can be moved together to a minimum distance comprising approximately three-fourths of the width of the flatbed portion 15, and at maximum extension are positioned apart approximately one and one-fourth times the width of the flat bed 15. This will generally leave a sufficient amount of the slides 150 to still be received in the channel 152, during complete extension, to fully support the hugger arms 20 and 21 and the bale 10. It will be understood that a wide variety of lengths of cuts 155, and slides 150, may be used, so that greater extension, or closer contraction, of the hugger arms can be achieved when desired.

Referring again to FIG. 8, the expansion/contraction mechanism 30 includes a pneudraulic cylinder and ram assembly 160 which biases the hugger arms 20 and 21 apart or together as selected. In the preferred embodiment, the pneudraulic cylinder assembly 160 comprises a cylinder 161 having two opposed, double acting pistons 162 and 163. In FIG. 8 piston 162 communicates between the assembly 160 and hugger arm 20 and is attached to a side extension 170 on the hugger arm 20 by a bolt 171. Analogously, piston 163 is attached to side extension 173 on hugger arm 21.

Extension and contraction of pistons 162 and 163, and thus expansion and contraction of the distance between hugger arms 20 and 21, are controlled by fluid lines 175 and 176. Although not shown, the fluid lines will be understood to communicate with a pump, not shown, mounted on the truck, as in box 100, FIG. 3. As is understood by reference to FIGS. 4 and 6, the pneudraulic cylinder assembly 160 is mounted within the longitudinal channel 152 and is anchored therein by a threaded stem 178 and nut 179. Thus, the pneudraulic cylinder assembly 160 is normally out of view, FIGS. 1 and 2.

Referring to FIGS. 1 and 7, cover slides 182 provide a cover in overlapping orientation over the contraction cuts 155 to help prevent hay, dirt, or other materials from falling into the longitudinal channel 152 between hugger arms, 20 and 21, and the pneudraulic cylinder assembly 160. Referring to FIGS. 8 and 9, the cover slides 182 are mounted on the hugger arms 20 and 21, and slide concomitantly with the hugger arms, 20 and 21, FIG. 7. Referring to FIG. 7, the cover slides 182 are, for the described embodiment, approximately twice as long as the associated contraction cuts 155, so that the contraction cuts 155 will remain covered even when the pneudraulic cylinder assembly 160 expands urging the hugger arms 20 and 21 their furthest distance apart. In this manner, the cover slides 182 will be understood to provide maximum protection of the pneudraulic cylinder assembly 160 from contact with hay, dirt or the elements, and further will help ensure less contamination of the hay bale 10 from any grease which may be associated with the pneudraulic cylinder assembly 160.

Each hugger arm 20 and 21 has a longitudinal row of teeth 184 mounted thereon to help ensure a non-slipping engagement between the hugger arms 20 and 21 and the hay bale 10 during operation of the assembly 1. In FIG. 8, reference numeral 184 generally indicates a row of teeth mounted upon hugger arm 21. It will be understood that hugger arm 20 includes an analogous row of teeth.

Figure 10:
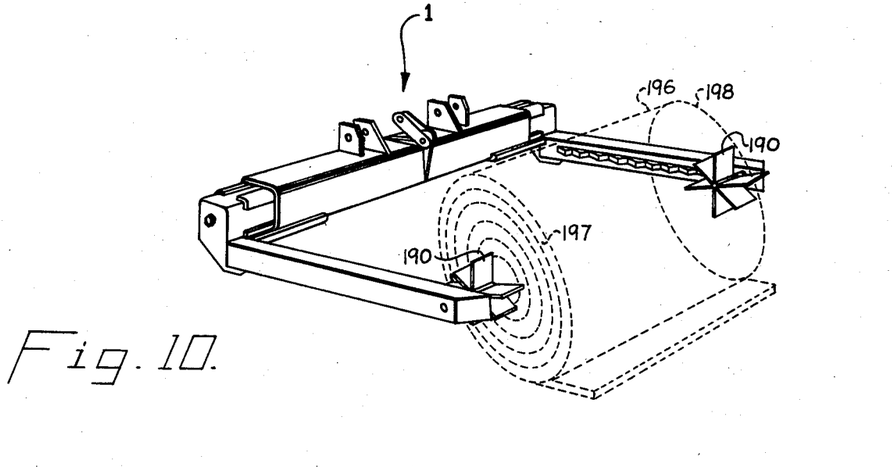
FIG. 10 is an enlarged, fragmentary rear perspective view of the invention, showing the assembly in the mode of operation analagous to that of FIG. 2 but with an optional attachment being used.

Also mounted on each hugger arm, 20 and 21, is an accessory post 186 by which items such as spinners may be mounted on the hugger arms 20 and 21. In FIG. 10, the invention is shown utilizing such spinners 190. The spinners 190 are pivotally mounted on the posts 186 and engage the hay bale 196 along the opposite ends 197 and 198 thereof. The hay bale 196 in FIG. 10 is being unrolled by the assembly 1. The spinners 190 permit the hay bale to rotate as the vehicle, not shown, having the assembly 1 mounted thereon is driven over the ground. The spinners 190 facilitate rapid unrolling of the hay bale as desired.

It will be readily understood that numerous accessories can be utilized with the present invention. Referring to FIGS. 1 and 2, a front stop 200 is mounted substantially along the front edge 40 of the flatbed portion 15. The front stop 200 serves to protect the cab 201 of the truck 2 from shifting loads carried upon the flatbed portion 15.

Also, in the embodiment described and shown, the hugger arms 20 and 21 are of substantially less length than the flatbed portion 15 and therefore do not extend completely to the front edge 40 of the flatbed 15 when they have been rotated to the extreme position shown in FIG. 1. Rails 205 are mounted adjacent the side edges 47 and 48 of the flat bed portion 15 substantially near the front edge 40 thereof, to help hold loads upon the truck 2 as it moves. It will be understood that a variety of side rails may be utilized. The stationary side rails 205 shown, which extend for a distance substantially less than a length of the flatbed 15, cooperate with the pivotable hugger arms 20 and 21 which also extend for a distance substantially less than a length of the flatbed 15, to form complete rails along both side edges 47 and 48, to prevent loads from sliding off of the flatbed 15.

In FIG. 3, a removable hitch ball 207 is shown mounted in the approximate center of the flatbed portion 15, by means of nut 208. The hitch ball 207 may be readily removed when a hay bale 10 is being manipulated upon the flatbed portion 15.

It is further foreseen that the box 100 may include a pump for operation of the pneudraulic cylinder, switches for their actuation, and storage space. Further, it will be understood by reference to FIG. 3, that other boxes, not shown, may be mounted on the lower surface 45 of the flat bed portion 15.

Referring again to FIGS. 2 and 3 operation of the assembly, in summary, is as follows. The loader/unloader mechanism 31 is actuated to lower the hugger arms 20 and 21 over the rear of the truck 2 for engagement with a hay bale 10, FIG. 2. The hugger arms are then expanded or contracted as necessary by the expansion/contraction mechanism 30 to engage the hay bale 10. After engagement, the loader/unloader mechanism 31 is again actuated to contract the ram 96, FIGS. 4, 5 and 6, and urge, through means of the linkage 72, rotation of the crossbar 70 toward the position shown in FIG. 1, loading the hay bale 10 upon the truck 2. Further actuation of the expansion/contraction mechanism 30 will be understood to release the hay bale 10 allowing it to rest freely upon the upper surface 35 of the flatbed portion 15. Finally, the hugger arms 20 and 21 are lowered to their non-use positions, FIG. 1.

From the above description it will be readily understood that when the assembly 1 is not utilized to carry a hay bale 10, the upper surface 35 of the flatbed portion 15 is substantially free from obstruction, except for the side rails 205 and the hugger arms 20 and 21, which, again, cooperate to form complete side rail members along the side edges 47 and 48 by a substantially colinear alignment with the stationary side rails 205. Thus, the truck 2 is free for general utility even though it has an apparatus 1 for loading large round hay bales mounted thereon. It will be further understood that even when a hay bale has been loaded upon the truck 2, as shown in FIG. 1, a substantial portion of the upper surface 35 of the flatbed portion 15 remains free and unobstructed for use. Alternatively, other items and equipment, besides hay bales, may be loaded and transported.

Also, by reference to FIG. 1, it will be understood that the assembly 1 does not interfere with normal operation of the truck 2. For example, view of the truck's rear lights 210 are left unobstructed by the assembly 1.

It is noted that while the present invention has been described and used for loading hay bales, it could be readily adapted for loading other items onto the rear of a truck. While certain embodiments of the present invention have been illustrated and described, it is not to be limited to the specific forms or arrangement of parts herein described and shown.

What is claimed and desired to be secured by Letters Patent is as follows:

1. A truck bed bale lift assembly, mountable on a vehicle such as a truck, for loading, transporting and unloading large bales of hay; said assembly comprising:
   (a) a flatbed portion upon which said bales are loaded and transported; said flatbed portion having an upper surface, a lower surface, first and second side edges and a rear edge;

(i) said flatbed portion lower surface having vehicle frame engaging bracket means thereon for selectively securing said truck bed bale lift assembly to a frame of said vehicle;

(b) a bale loader assembly mounted on said flatbed portion; said bale loader assembly having crossbar means, expansion means, first and second hugger arms and pivoting means;

(i) said crossbar means including an elongate tubular bar pivotally mounted on a rear edge of said flatbed portion, said crossbar means having an upper surface; said bar having an elongate longitudinal channel passing completely therethrough; said bar channel having a first end and a second end;

(ii) said crossbar means also including first and second telescoping members; said first telescoping member being mounted in said channel first end and being selectively partially extendable outwardly from said bar; said second telescoping member being slidably mounted in said channel second end and being selectively partially extendable outwardly from said bar;

(iii) said expansion means including a double-action expansion and contraction assembly having first and second opposing pistons; said expansion means double-action expansion and contraction assembly being mounted inside said bar channel with said first piston engaging said first telescoping member and said second piston engaging said second telescoping member, for selectively expanding and contracting a distance of said first and second telescoping members from one another;

(iv) said first hugger arm being mounted on said first telescoping member and said second hugger arm being mounted on said second telescoping member; said hugger arms being selectively actuated for lateral movement as said expansion means is actuated;

(v) said pivoting means including a pivoting actuator and a bar linkage; said pivoting actuator being mounted on said flatbed portion lower surface; said linkage connecting said pivoting actuator to said crossbar for selective pivoting of same;

(c) first and second contraction cuts in said crossbar means upper surface;

(i) said first contraction cut enabling said first telescoping member to slide within said crossbar means and move said first hugger arm to a selected position spaced laterally between said expansion means double-action expansion and contraction assembly and said bar channel first end;

(ii) said second contraction cut enabling said second telescoping member to slide within said crossbar and move said second hugger arm to a selected position spaced laterally between said expansion cylinder and piston and said bar channel second end; and (d) first and second contraction cut covers;

(i) said first contraction cut cover being mounted on said first telescoping member in an overlapping orientation with said first contraction cut; said first contraction cut cover being slidable with said first telescoping member to maintain said overlapping orientation with a portion of said first contraction cut between said first hugger arm and said expansion cylinder piston assembly;

(ii) said second contraction cut cover being mounted on said second telescoping member in an overlapping orientation with said second contraction cut; said second contraction cut cover being slidable with said second telescoping member to maintain said overlapping orientation with a portion of said second contraction cut between said second hugger arm and said expansion cylinder and piston assembly;

(e) whereby said truck bed bale lift assembly is selectively mountable on, and dismountable from, the vehicle frame;

(f) whereby actuation of said expansion means selectively engages said hugger arms to grab or release a bale; and actuation of said pivoting means selectively loads said bale onto said flatbed upper surface or unloads said bale therefrom;

(g) whereby said hugger arms are selectively actuatable to engage a bale having a longitudinal length substantially less than a length of said bar;

(h) whereby said flatbed upper surface is substantially unobstructed by portions of said bale loader assembly.

2. A truck bed bale lift assembly according to claim 1 wherein:

(a) said first and second pivotable hugger arms are simultaneously pivotable to a first extreme position by pivoting of said bar;

(i) said pivotable hugger arms, when in said first position, resting upon said flatbed portion upper surface and forming elongate side rails extending along said flatbed portion side edges to aid in retaining objects on said flatbed portion.

3. A truck bed bale lift assembly according to claim 2 wherein:

(a) said flatbed portion includes a front edge separated from said rear edge by a distance of sufficient length to enable said flatbed portion to receive two bales of hay thereon by means of said bale leader assembly; and (b) said truck bed bale lift assembly includes first and second stationary side rails mounted on said flatbed portion upper surface and extending partially along said first and second side edges;

(i) said pivotable hugger arms, when in said first position, cooperating with said first and second stationary side rails to form elongate side rails extending substantially completely along said flatbed portion side edges and aiding in retaining objects on said flatbed portion upper surface;

(c) whereby said bale lift assembly may be utilized to simultaneously transport at least two large bales of hay.

4. A truck bed bale lift assembly according to claim 2 wherein:

(a) said pivoting actuator comprises a pivoting actuator cylinder and piston assembly; said pivoting actuator cylinder piston assembly having a first end and a second end;

(i) said pivoting actuator cylinder and piston assembly first end being pivotally mounted on said flatbed lower surface;

(ii) said pivoting actuator cylinder and piston assembly second end being pivotally connected to said bar linkage; and (b) a pivoting link having first and second ends; said link being a portion of said bar linkage and having said link first end pivotally connected to said pivoting cylinder and piston assembly, and having said link second end pivotally mounted on said bar;
(c) an idler link pivotally mounted on said flatbed lower surface substantially near said flatbed rear edge; said idler link directing arc movement of said cylinder and piston assembly during actuation of said pivoting means to rotate said bar and load or unload bales of hay;
  (i) said idler link and pivoting link being mounted generally underneath said flatbed portion and having substantially no rearward extension rearwardly of the vehicle frame, beyond a combined rearward extension of said flatbed portion and elongate bar, when said pivoting actuator is in an orientation having said hugger arms in said first position.

5. A truck bed bale lift assembly, mountable on a vehicle such as a truck, for loading, transporting and unloading large bales of hay; said assembly comprising:
  (a) a flatbed portion upon which said bales are loaded and transported; said flatbed portion having an upper surface, a lower surface, first and second side edges, a front edge and a rear edge, and a rear edge flange member;
    (i) said flatbed portion lower surface having vehicle frame engaging means thereon for selectively securing said truck bed bale lift assembly to the frame of said vehicle beneath said upper surface;
  (b) a bale loader assembly mounted on said flatbed portion; said bale loader assembly having crossbar means, expansion means, first and second hugger arms and pivoting means;
    (i) said crossbar means being pivotally mounted on said rear edge flange member and being pivotable between first and second extreme positions;
    (ii) said crossbar means including a flatbed continuing surface portion and a rear edge abutting surface portion; a said crossbar means flatbed continuing surface portion, when said crossbar means is in said first extreme position, being aligned substantially coplanar with said flatbed portion upper surface, and, said crossbar means rear edge abutting surface portion, when said crossbar means is in said first extreme position, substantially abutting said rear edge flange member;
    (iii) said hugger arms being slidably mounted on said crossbar means and being oriented to rest on said flatbed portion upper surface when said crossbar means is in said first extreme position, said crossbar means having contraction cuts in said crossbar means' flatbed continuing surface portion for movement of said hugger arms; said hugger arms extending for a distance substantially less than a length of said flatbed between said front and rear edges;
    (iv) said expansion means including a double action expansion and contraction assembly engaging said hugger arms to selectively slide same toward or away from one another, to grip or release a large bale of hay;
    (v) said pivoting means being mounted substantially underneath said flatbed portion upper surface, with portions extending rearwardly therefrom, said pivoting means selectively rotating said crossbar means between said first and second extreme positions; and
  (c) side rails extending rearwardly from said front edge along said flatbed portion side edges;
    (i) said hugger arms being selectively positionable, by said expansion means, and said pivoting means to align said hugger arms generally colinearly with said side rails and cooperate therewith to form elongate rail members extending substantially completely along said flatbed portion side edges;
  (d) whereby said hugger arms, when not in use, function as continuations of said side rails on said flatbed portion upper surface.

6. A truck bed bale lift assembly, mountable on a vehicle such as a truck, for loading, transporting and unloading large bales of hay; said assembly comprising:
  (a) flatbed portion upon which said bales are loaded and transported; said flatbed portion having an upper surface, a lower surface, first and second side edges, a front edge and a rear edge;
    (i) said flatbed portion lower surface having vehicle frame engaging means thereon for selectively securing said truck bed bale lift assembly to the frame of said vehicle beneath said upper surface;
  (b) bale loader assembly mounted on said flatbed portion; said bale loader assembly having pivoting means, crossbar means, first and second hugger arms, and expansion means;
    (i) said crossbar means being pivotally mounted substantially adjacent said flatbed portion rear edge and being pivotable between first and second extreme positions to load or unload an engaged bale;
    (ii) said hugger arms extending for a length substantially less than said flatbed portion and being slidably mounted on said crossbar means; said hugger arms being oriented to rest on said flatbed portion upper surface when said crossbar means is in said first extreme position and said crossbar means having an upper surface with contraction cuts therein for movement or said hugger arms;
    (iii) said expansion means including a double action expansion and contraction assembly engaging said hugger arms to selectively slide same toward or away from one another, to grip or release a large bale of hay;
    (iv) said pivoting means being mounted substantially underneath said flatbed portion upper surface, with portions extending generally rearwardly therefrom, said pivoting means selectively rotating said crossbar means between said first and second extreme positions; and
  (c) side rails extending rearwardly from said front edge generally along said flatbed portion side edge, said side rails being of substantially less length then said flatbed portion;
    (i) said hugger arms being selectively positionable, by said expansion means and said pivoting means, to align said hugger arms generally colinearly with said side rails and cooperate therewith to form elongate rail members extending substantially completely along said flatbed portion side edges;
  (d) whereby said hugger arms, when not is use, function as continuations of said side rails on said flatbed portion upper surface.

* * * * *